US012156559B2

(12) United States Patent
Chae et al.

(10) Patent No.: US 12,156,559 B2
(45) Date of Patent: Dec. 3, 2024

(54) CLOTHES FOLDING DEVICE

(71) Applicant: LG Electronics Inc., Seoul (KR)

(72) Inventors: Aekyung Chae, Seoul (KR); Keunjoo Kim, Seoul (KR); Hyungkyu Youk, Seoul (KR); Sangjo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 17/910,708

(22) PCT Filed: Jan. 8, 2021

(86) PCT No.: PCT/KR2021/000249
§ 371 (c)(1),
(2) Date: Sep. 9, 2022

(87) PCT Pub. No.: WO2021/182736
PCT Pub. Date: Sep. 16, 2021

(65) Prior Publication Data
US 2023/0148695 A1     May 18, 2023

(30) Foreign Application Priority Data
Mar. 10, 2020  (KR) .......................... 10-2020-0029590

(51) Int. Cl.
*A41H 43/02*     (2006.01)
*B65G 65/02*     (2006.01)
*D06F 89/02*     (2006.01)

(52) U.S. Cl.
CPC ......... *A41H 43/0257* (2013.01); *B65G 65/02* (2013.01); *D06F 89/02* (2013.01); *D06F 89/026* (2013.01); *B65G 2201/0229* (2013.01)

(58) Field of Classification Search
CPC ........ D06F 89/00; D06F 89/02; D06F 89/023; A41H 43/0257; B65G 65/02
(Continued)

(56) References Cited

U.S. PATENT DOCUMENTS

| 3,361,424 A | * | 1/1968 | Kamberg | ................ D06F 89/00 |
| | | | | 493/418 |
| 2019/0309465 A1 | * | 10/2019 | Rozov | ................ A41H 43/0257 |

(Continued)

FOREIGN PATENT DOCUMENTS

| CN | 108611838 | 10/2018 |
| CN | 109736061 | 5/2019 |

(Continued)

OTHER PUBLICATIONS

International Search Report in International Appln. No. PCT/KR2021/000249, dated Apr. 26, 2021, 5 pages (with English translation).
(Continued)

*Primary Examiner* — Nathan E Durham
(74) *Attorney, Agent, or Firm* — Fish & Richardson P.C.

(57) ABSTRACT

A clothes folding device includes a loading assembly which pushes in the clothes and seats the clothes on a loading conveyor for transportation, a folding assembly which transports the clothes forward or backward and performs the folding of the clothes, an unloading assembly which is provided below the folding assembly and loads the clothes discharged from the folding assembly. The unloading assembly includes an upper unloading layer where the clothes finally folded by the folding assembly is primarily dropped and seated and which includes an unloading conveyor, a rotation drive unit that rotates the unloading conveyor, an upper front-rear drive unit which moves the upper unloading layer in a forward and backward direction, a lower unloading layer where the clothes seated on the upper unloading layer are secondarily dropped and seated, and an up and down drive unit which moves the lower unloading layer in an up or down direction.

13 Claims, 24 Drawing Sheets

(58) Field of Classification Search
USPC .......................................................... 223/37
See application file for complete search history.

(56) References Cited

U.S. PATENT DOCUMENTS

2020/0248397 A1* 8/2020 Nitschmann ........... B65H 29/16
2020/0385918 A1* 12/2020 Naor ....................... D06F 89/00

FOREIGN PATENT DOCUMENTS

| JP | 6049119 | 6/1994 |
| JP | 2000024400 | 1/2000 |
| JP | 2008121142 | 5/2008 |
| JP | 2010051428 | 3/2010 |
| WO | WO2019038752 | 2/2019 |

OTHER PUBLICATIONS

Extended European Search Report in European Appln. No. 21767636.0, mailed on Feb. 7, 2024, 8 pages.

* cited by examiner

CLOTHES FOLDING DEVICE

CROSS-REFERENCE TO RELATED APPLICATIONS

This application is a National Stage application under 35 U.S.C. § 371 of International Application No. PCT/KR2021/000249, filed on Jan. 8, 2021, which claims the benefit of Korean Application No. 10-2020-0029590, filed on Mar. 10, 2020. The disclosures of the prior applications are incorporated by reference in their entirety.

TECHNICAL FIELD

The present disclosure relates to an automated device that performs the folding of clothes.

BACKGROUND ART

Clothes are made of soft materials such as natural or synthetic fiber, etc., and folding of clothes must be performed to an appropriate size and shape for the purpose of storage and transport thereof.

Generally, clothes are required to be folded very frequently or in large amounts for storage after being washed or for long-term storage according to seasonal changes. However, direct folding of clothes by manpower causes waste of time and resources. Also, when the shape and size of folded clothes do not match due to unskilled manpower, additional labor must be input in for display or storage.

Accordingly, there is an increasing need for an automated device (hereinafter, referred to as a "clothes folding device") which quickly and uniformly perform the folding of clothes. PCT Publication No. 2018-122841 issued on Jul. 5, 2018 discloses a conventional clothes folding device (title of the invention: DOMESTIC COMPACT ARTICLE FOLDING MACHINE HAVING STACKED CONVEYOR LAYERS AND FOLDING METHOD THEREFOR) (hereinafter, referred to as "prior art document"). The prior art document includes technical characteristics of an automated device which performs folding in the process that clothes are pushed in the upper portion and transported, and then discharges from the lower portion.

However, the device of the prior art has the following problems.

The folded clothes are dropped and loaded on a seating plate of a drawer provided at the lower portion of the device. In order for the clothes to be stably seated on the seating plate during the loading process, the seating plate performs up and down and forward and backward movements. More specifically, in order for the clothes to approach the drop point of the clothes, the seating plate performs an upward movement, and then performs a forward and backward movement such that one side of the clothes can be sequentially seated. In particular, in order for the entire area of one side of the clothes to be stably seated on the seating plate, the seating plate must be able to move sufficiently forward or backward. Accordingly, in order to implement this structure, the overall size of the device, particularly, the front-rear width must be sufficiently large, or otherwise, even though the size of the device is reduced, the drawer provided with the seating plate must be pulled out forward or backward in order to secure a space for the seating plate to protrude.

DISCLOSURE

Technical Problem

The purpose of the present disclosure is to solve a problem that, in the clothes folding device, in the process of unloading the folded clothes and loading, the size of the clothes folding device is unnecessarily increased in order to secure a forward and backward space when the unloading is performed, or a problem that the drawer must repeatedly protrude to the front or rear of the device.

Technical Solution

One embodiment is a clothes folding device which functions to perform folding in a process of transporting clothes. The clothes folding device includes: a loading assembly which pushes in the clothes and seats the clothes on a loading conveyor for transportation; a folding assembly which transports the clothes forward or backward and performs the folding of the clothes; an unloading assembly which is provided below the folding assembly and loads the clothes discharged from the folding assembly. The unloading assembly includes: an upper unloading layer where the clothes finally folded by the folding assembly is primarily dropped and seated and which comprises an unloading conveyor; a rotation drive unit which drives such that the unloading conveyor rotates; an upper front-rear drive unit which moves the upper unloading layer in a forward and backward direction; a lower unloading layer where the clothes seated on the upper unloading layer are secondarily dropped and seated; and an up and down drive unit which moves the lower unloading layer in an up or down direction.

The rotation drive unit and the upper front-rear drive unit rotate together while the secondary dropping is performed. The rotation drive unit and the upper front-rear drive unit are driven such that when a top surface of the unloading conveyor moves forward, the upper unloading layer moves backward, and when the top surface of the unloading conveyor moves backward, the upper unloading layer moves forward.

The up and down drive unit is driven such that, while the secondary dropping is performed, a secondary drop distance, that is, a distance from an uppermost end of the clothes loaded on the lower unloading layer or a top surface of the lower unloading layer on which the clothes are not loaded to the upper unloading layer maintains a first distance.

The up and down drive unit is driven such that, while the secondary dropping is performed, a secondary drop distance, that is, a distance from an uppermost end of the clothes loaded on the lower unloading layer or a top surface of the lower unloading layer on which the clothes are not loaded to the upper unloading layer increases from a second distance to a third distance.

The clothes folding device further includes a load sensor which senses a height of a top surface of the lower unloading layer or a height of an uppermost end of the clothes loaded on the lower unloading layer.

The clothes folding device further includes a frame which forms an external skeleton of the clothes folding device, is disposed at an outer edge, and defines a minimum working space of the clothes folding device. The unloading assembly further includes a drawer which forms a space in which clothes are loaded and mounts the lower unloading layer and the up and down drive unit.

The upper front-rear drive unit includes a rack-and-pinion structure installed on both sides of the upper unloading layer and in an area of the frame corresponding to both sides of the upper unloading layer.

The up and down drive unit includes the rack-and-pinion structure installed on both sides of the lower unloading layer and in a side of the drawer corresponding to both sides of the lower unloading layer.

The up and down drive unit includes a scissor type lift structure which is installed on a bottom surface of the drawer and has an upper portion to which the lower unloading layer is coupled.

The clothes folding device further includes a lower front-rear drive unit which moves the lower unloading layer forward or backward. The lower front-rear drive unit includes the rack-and-pinion structure which is fastened to the lower unloading layer and moves the lower unloading layer in the forward and backward direction.

The clothes folding device further includes a pressure guide provided on a lower surface of the upper unloading layer. The up and down drive unit is driven such that an uppermost end of the clothes loaded on the lower unloading layer is pressed by the pressure guide.

The unloading assembly further includes a drawer which forms a space in which clothes are stored. The up and down drive unit is driven such that when the drawer is opened to take out the clothes, a top surface of the lower unloading layer on which the clothes are not present or an uppermost end of the clothes loaded on the lower unloading layer maintains a predetermined distance from a bottom surface of the drawer.

A front-rear width of the upper unloading layer with respect to a space that the upper unloading layer occupies in the forward and backward direction is in a range of 0.28 to 0.36. A front-rear stroke distance of the upper unloading layer with respect to the space that the upper unloading layer occupies in the forward and backward direction is in a range of 0.5 to 0.65.

Another embodiment is a clothes folding device which functions to perform folding in a process of transporting clothes. The clothes folding device includes: a loading assembly which pushes in the clothes and seats the clothes on a loading conveyor for transportation; a folding assembly which transports the clothes forward or backward and performs the folding of the clothes; an unloading assembly which is provided below the folding assembly and loads the clothes discharged from the folding assembly. The unloading assembly includes: an upper unloading layer where the clothes finally folded by the folding assembly is primarily dropped and seated and which comprises an unloading conveyor; a rotation drive unit which drives such that the unloading conveyor rotates; a lower unloading layer where the clothes seated on the upper unloading layer are secondarily dropped and seated; a lower front-rear drive unit which moves the lower unloading layer forward and backward; and an up and down drive unit which moves the lower unloading layer in an up or down direction.

The lower front-rear drive unit is implemented as a rack-and-pinion structure. The up and down drive unit is implemented as a scissor type lift structure. The up and down drive unit is provided on the lower front-rear drive unit.

Advantageous Effects

According to at least one of the embodiments of the present disclosure, it is possible to minimize the front-rear width of the clothes folding device.

Also, according to at least one of the embodiments of the present disclosure, it is possible to increase the operational reliability of an unloading assembly driver.

Also, according to at least one of the embodiments of the present disclosure, it is possible to reduce the power consumption of the unloading assembly driver.

Further scope of applicability of the present invention will become apparent from the following detailed description for embodying the present invention. However, since various changes and modifications within the spirit and scope of the present invention can be clearly understood by those skilled in the art, specific embodiments such as embodiments included in the following detailed description for embodying the present invention should be understood as being merely illustrative.

MODE FOR INVENTION

Figure 1:
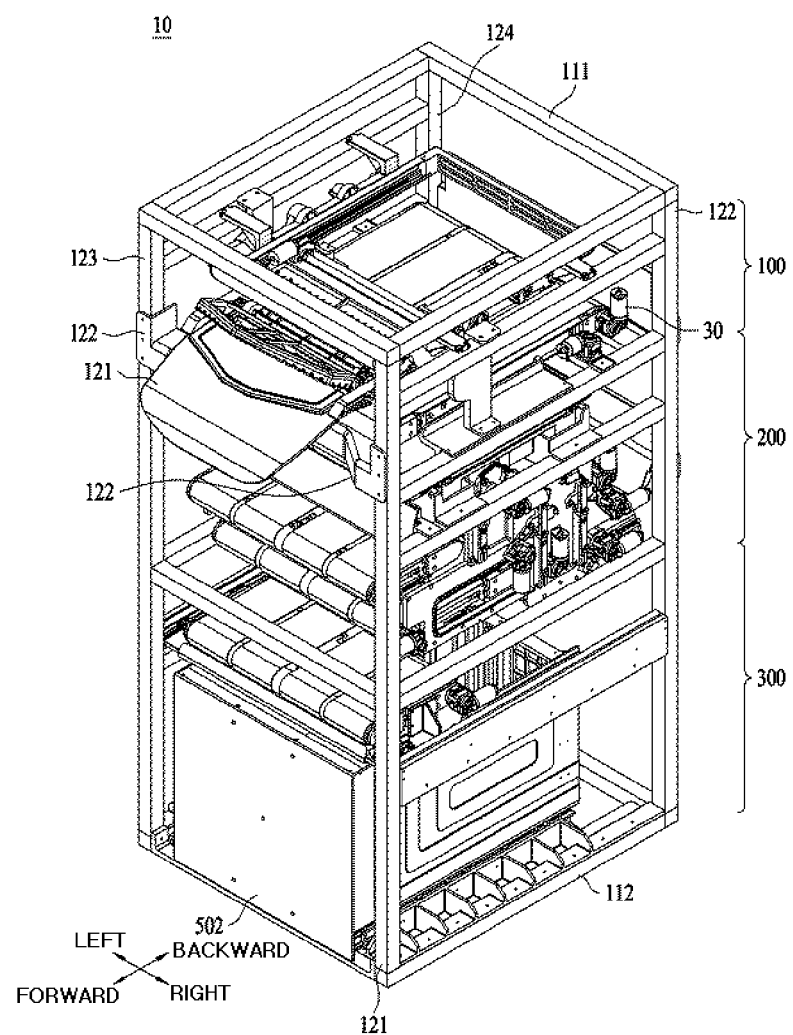
FIG. 1 is a perspective view of a clothes folding device 10 according to an embodiment of the present disclosure.

Hereinafter, embodiments disclosed in this specification will be described in detail with reference to the accompanying drawings. The same or similar elements will be denoted by the same reference numerals irrespective of drawing numbers, and repetitive descriptions thereof will be omitted. A suffix "assembly" and "part" for the component, which is used in the following description, is given or mixed in consideration of only convenience for ease of specification, and does not have any distinguishing meaning or function per se. Also, in the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present invention are understood to be included in the accompanying drawings.

While terms including ordinal numbers such as the first and the second, etc., can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

Figure 2:
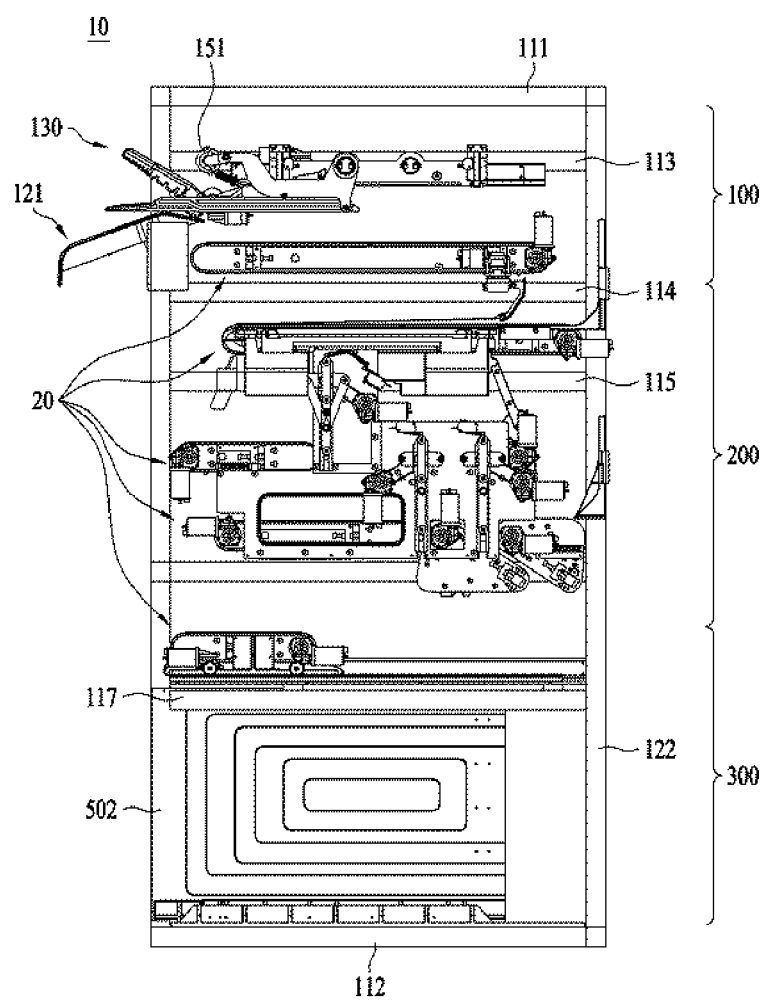
FIG. 2 is a side view of the clothes folding device 10 of FIG. 1.
Figure 3:
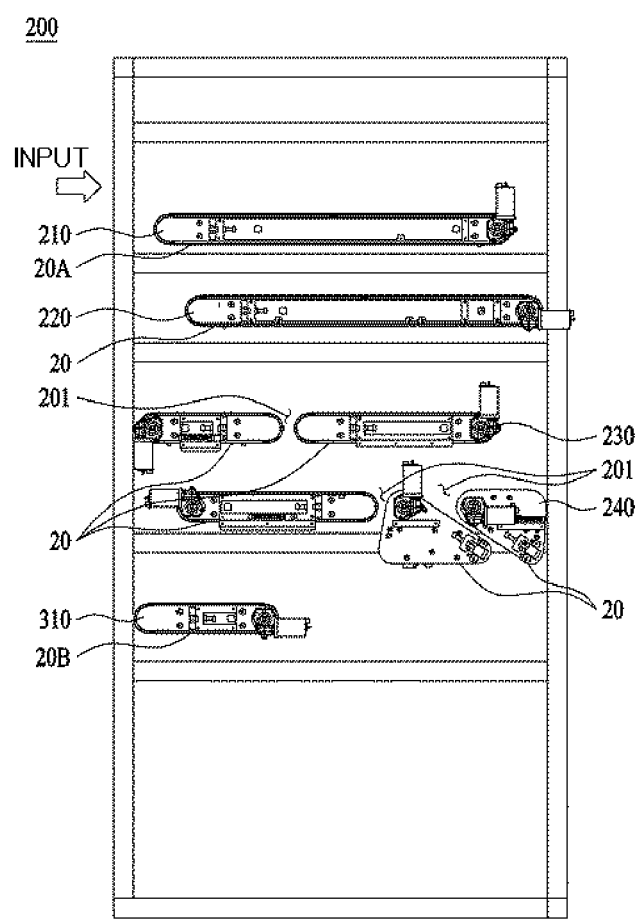
FIG. 3 is a side view of the clothes folding device 10, which shows a configuration of a folding assembly 200 according to the embodiment of the present disclosure.

Hereinafter, a clothes folding device 10 according to an embodiment of the present disclosure will be described based on the description of FIGS. 1 to 3. FIG. 1 is a perspective view of the clothes folding device 10 according to an embodiment of the present disclosure. FIG. 2 is a side view of the clothes folding device 10 of FIG. 1. FIG. 3 is a side view of the clothes folding device 10, which shows a configuration of a folding assembly 200 according to the embodiment of the present disclosure.

Referring to FIGS. 1 to 2, the clothes folding device 10 according to the embodiment of the present disclosure may be supported and installed in a frame 110. The frame 110 may function as an external skeleton of the clothes folding device 10. The frame 110 is disposed at the outer edge of the clothes folding device 10 and defines a minimum working space of the clothes folding device 10, and can stably attach and support various members constituting the clothes folding device 10.

The frame 110 includes an upper frame 111, a lower frame 112, and horizontal frames 113, 114, 115, 116, and 117. The frame 110 includes vertical frames 121, 122, 123, and 124 disposed vertically to support the upper frame 111, the lower frame 112, and the horizontal frame.

A finish cover (not shown) may be stably attached to the outer surface of the frame 110. The finish cover may form an exterior of the clothes folding device 10.

The clothes folding device 10 includes a loading assembly 100, a folding assembly 200, and an unloading assembly 300.

The loading assembly 100, the folding assembly 200, and the unloading assembly 300 may be supported by the frame 110. In addition, working spaces of the loading assembly 100, the folding assembly 200, and the unloading assembly 300 may be defined by the frame 110.

For example, the working space of the loading assembly 100 may be defined by the upper frame 111 and the horizontal frame 114, and the working space of the unloading assembly 300 may be defined by the horizontal frame 116 and the lower frame 112.

The loading assembly 100 is provided such that clothes are pushed in. The loading assembly 100 may be provided such that the pushed-in clothes can be placed on the upper surface of a conveyor 20. Specifically, the loading assembly 100 may be placed on the upper surface of the conveyor 20 of a first folding layer 210 between the upper frame 111 and the horizontal frame 114.

Here, the term "clothes" refers to a top or bottom made of natural or synthetic fibers that can be worn by humans, and also includes any article that can be provided folded to a desired size and thickness through the clothes folding device, such as a towel or blanket.

A plurality of conveyors 20 may be supported by horizontal frames 113, 114, 115, 116, and 117.

The folding assembly 200 is provided such that the pushed-in clothes are folded while being transported. The folding assembly 200 includes at least two folding layers such that the pushed-in clothes are folded to a certain size and shape while being transported. The at least two folding layers are placed above and below and are spaced apart from each other. As the pushed-in clothes are transported from the upper folding layer to the lower folding layer, folding occurs at least once in each folding layer, and as a result, the clothes which have been folded to a certain size and shape are loaded by the unloading assembly 300.

More specifically, the folding assembly 200 may include four folding layers 210, 220, 230, and 240. The four folding layers 210, 220, 230, and 240 may be placed above and below and are spaced apart from each other. As the pushed-in clothes are transported from the first upper folding layer 210 to the fourth lower folding layer 240, the four folding layers function to cause the pushed-in clothes to be folded to a certain size and shape. The folding occurs at least once in each folding layer. In particular, the folding may occur twice in the fourth folding layer 240.

The folding layers 210, 220, 230, and 240 are responsible for seating, transporting, and folding clothes. Each of the folding layers 210, 220, 230, and 240 is provided with at least one conveyor 20 to perform the functions described above, in particular transporting and folding. In particular, the clothes are folded by being inserted into two adjacent conveyors 20 on one folding layer. This is implemented such that the clothes can be folded or can pass while being folded, by a folding gap 201 between two adjacent conveyors 20 on one folding layer.

The four folding layers 210, 220, 230, and 240 may include at least one conveyor 20. The third folding layer 230 may include two conveyors 20, and the fourth folding layer 240 may include three conveyors 20. The folding gap 201 may be formed between the two conveyors provided in the third folding layer 230 in order to allow the clothes to pass through while being folded. Two folding gaps 201 may be formed between the three conveyors provided in the fourth folding layer 240 in order to allow the clothes to be folded or to pass through while being folded.

The clothes completely pass through the folding gap 201 and then may be folded and discharged to a lower layer at the same time, or may be inserted into the folding gap 201 and then pulled out again to maintain the layer and only folding may be performed. When only folding is performed in the folding gap 201, the clothes are discharged to the lower layer through another folding gap 201 or through one end of a layer other than the folding gap 201 (for example, the rear end of the third folding layer 230).

As in the embodiment of FIG. 3, the clothes are vertically folded in upper two folding layers 210 and 220 of the four folding layers constituting the folding assembly 200 (strictly, the first vertical folding is performed in the loading assembly 100 of the layer where the folding layer 210 is positioned), and the clothes may be horizontally folded in the lower two folding layers 230 and 240.

Here, the horizontal folding means that the clothes are folded with respect to a reference line perpendicular to a proceeding direction of the clothes. The direction perpendicular to the proceeding direction of the clothes is not limited to an exact angle of 90 degrees between the proceeding direction of the clothes and a folding line of the clothes, and includes an error range of 0 to 30 degrees.

Here, the vertical folding means that the clothes are folded with respect to a reference line parallel to the proceeding direction of the clothes. The direction parallel to the proceeding direction of the clothes is not limited to an exact angle of 0 degree between the proceeding direction of the clothes and a folding line of the clothes, and includes an error range of 0 to 30 degrees.

Figure 4:
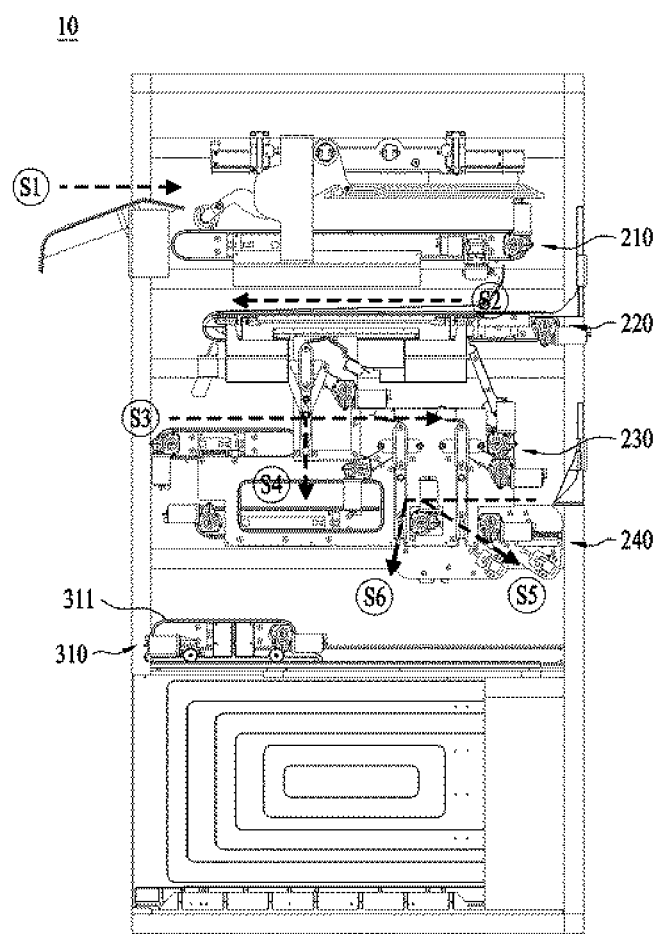
FIG. 4 is a conceptual view showing a position where folding is performed in the folding assembly.
Figure 5:
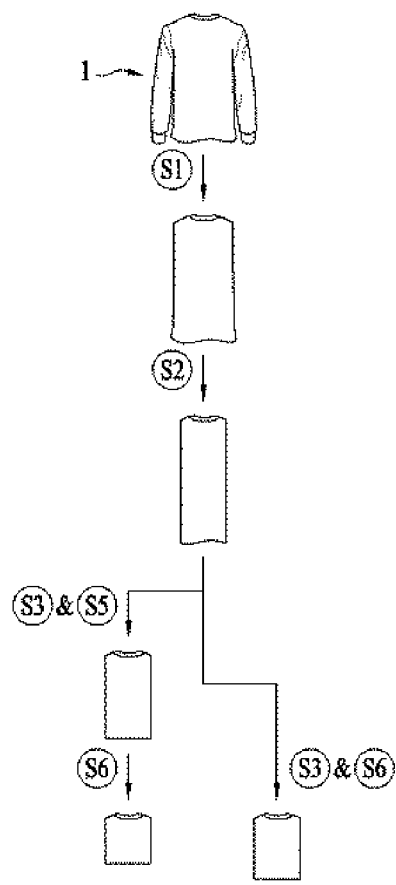
FIG. 5 is a flow chart showing an embodiment of the clothes folding method for the top of the clothes.
Figure 6:
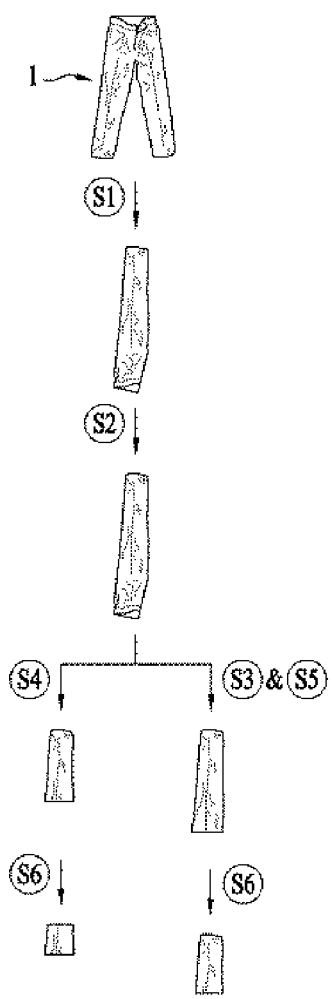
FIG. 6 is a flow chart showing an embodiment of the clothes folding method for the bottom of the clothes.
Figure 7:
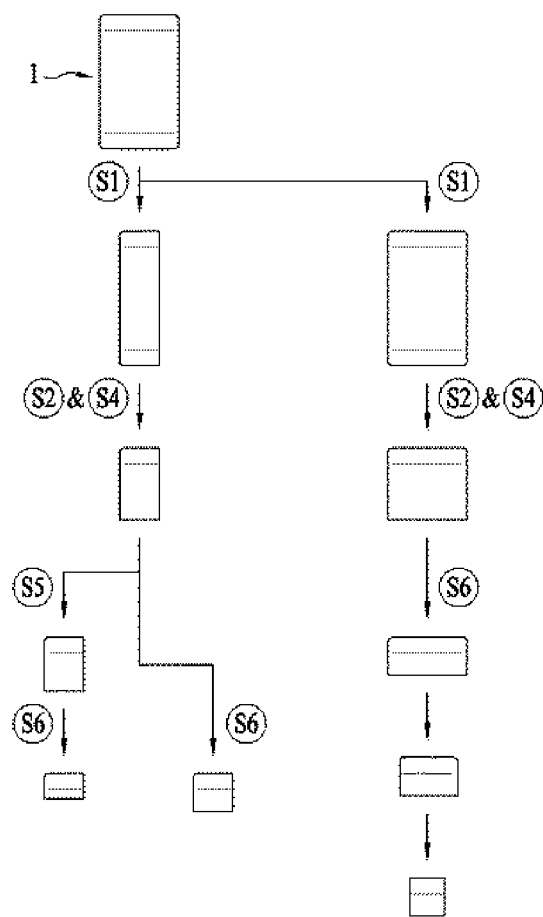
FIG. 7 is a flowchart showing an embodiment of the clothes folding method of towels.

FIGS. 4 to 7 show various clothes folding methods by the clothes folding device according to the embodiment of the present disclosure. FIG. 4 is a conceptual view showing a position where folding is performed in the folding assembly. FIG. 5 is a flowchart showing an embodiment of the clothes folding method for the top of the clothes. FIG. 6 is a flowchart showing an embodiment of the clothes folding method for the bottom of the clothes. FIG. 7 is a flowchart showing an embodiment of the clothes folding method of towels.

The embodiment of the folding assembly 200 includes a first vertical folding step S1 in which the clothes pushed into the clothes folding device according to the embodiment of the present disclosure are folded in the first folding layer 210, a second vertical folding step S2 in which the clothes are folded in the second folding layer 220, a first horizontal folding step S3 and S4 in which the clothes are folded in the third folding layer 230, and a second horizontal folding step S5 and S6 in which the clothes are folded in the fourth folding layer 240.

The first horizontal folding step S3 and S4 includes a transport step S3 in which the clothes are not folded and is transported to the lower fourth folding layer 240, and a folding step S4.

The second horizontal folding step S5 and S6 includes a ⅓ folding step S5 in which folding is performed at ⅓ point on the basis of the transport direction, and a ½ folding step S6 in which folding is performed at ½ point on the basis of the transport direction.

According to the embodiment of FIG. 5, the top of the clothes pushed into the clothes folding device according to the embodiment of the present disclosure may be vertically folded in the first vertical folding step S1 and the second vertical folding step S2, respectively. Then, the horizontal folding step is performed on the top. Two embodiments will be described.

According to a first embodiment, the clothes on which the vertical folding has been performed is transported (S3) immediately without being folded in a third horizontal folding step. Then, the ⅓ folding step S5 and the ½ folding step S6 are sequentially performed in a fourth horizontal folding step, so that three-stage horizontally folded top can be discharged (the flowchart on the left in FIG. 5).

According to a second embodiment, the clothes on which the vertical folding has been performed is transported (S3) immediately without being folded in the third horizontal folding step. Then, only the ½ folding step S6 is performed in the fourth horizontal folding step, so that four-stage horizontally folded top can be discharged (the flowchart on the right in FIG. 5).

According to the embodiment of FIG. 6, the bottom of the clothes pushed into the clothes folding device according to the embodiment of the present disclosure may be vertically folded one time while going through the first vertical folding step S1 and the second vertical folding step S2. That is, in the second vertical folding step S2, the folding by a vertical folding assembly is not performed and the clothes are immediately transported. Then, the horizontal folding step is performed on the bottom. Two embodiments will be described.

According to the first embodiment, the clothes on which the vertical folding has been performed is horizontally folded (S4) in the third horizontal folding step. Then, the horizontal folding of the ½ folding step S6 is subsequently performed in the fourth horizontal folding step, so that four-stage horizontally folded bottom can be discharged (the flowchart on the left in FIG. 6).

According to the second embodiment, the clothes on which the vertical folding has been performed is transported (S3) immediately without being folded in the third horizontal folding step. Then, the ⅓ folding step S5 and the ½ folding step S6 are sequentially performed in the fourth horizontal folding step, so that three-stage horizontally folded bottom can be discharged (the flowchart on the right in FIG. 6).

According to the embodiment of FIG. 7, the vertical folding step and the horizontal folding step are performed on towels pushed in by the clothes folding device according to the embodiment of the present disclosure. Three embodiments will be described.

According to the first embodiment, pushed-in towels may be vertically folded one time while going through the first vertical folding step S1 and the second vertical folding step S2. That is, in the second vertical folding step S2, the folding by the vertical folding assembly is not performed and the towels are immediately transported. Subsequently, the horizontal folding is performed in the third horizontal folding step (S4), and then the ⅓ folding step S5 and the ½ folding step S6 are sequentially performed in the fourth horizontal folding step, so that the towels having a size and shape of a hand towel suitable for being stored in a bathroom cabinet can be discharged (the flowchart on the left in FIG. 7).

According to the second embodiment, the pushed-in towels may be vertically folded one time while going through the first vertical folding step S1 and the second vertical folding step S2. That is, in the second vertical folding step S2, the folding by the vertical folding assembly is not performed and the towels are immediately transported. Subsequently, the horizontal folding is performed in the third horizontal folding step (S4), and then the ½ folding step S6 of the fourth horizontal folding step is immediately performed, so that the towels having a size and shape of a hand towel which are different from the size and shape of the hand towel of the first embodiment can be discharged (the flowchart in the middle of FIG. 7).

According to a third embodiment, the pushed-in towels are immediately transported without being vertically folded while going through the first vertical folding step S1 and the second vertical folding step S2. Then, the horizontal folding is performed in the third horizontal folding step (S4), and then the ½ folding step S6 of the fourth horizontal folding step is immediately performed, so that the towels having a size and shape of a hand towel which are different from the sizes and shapes of the hand towels of the first and second embodiments can be discharged (the flowchart on the right in FIG. 7). According to another embodiment, a vertical folding layer may be added below the fourth folding layer 240 such that the horizontal folding is completed and then the vertical folding is additionally performed. In this case, the towels in the form of a hand towel having a vertical width smaller than that of the towel of the third embodiment can be discharged and be appropriately received in an intended bathroom cabinet.

Figure 8:
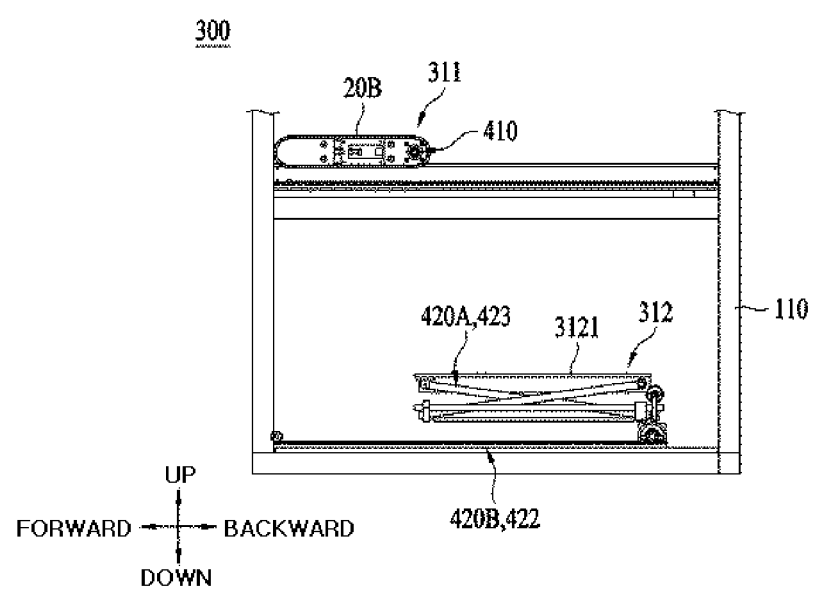
FIGS. 8 and 9 show a first embodiment of an unloading assembly related to the present disclosure.
Figure 9:
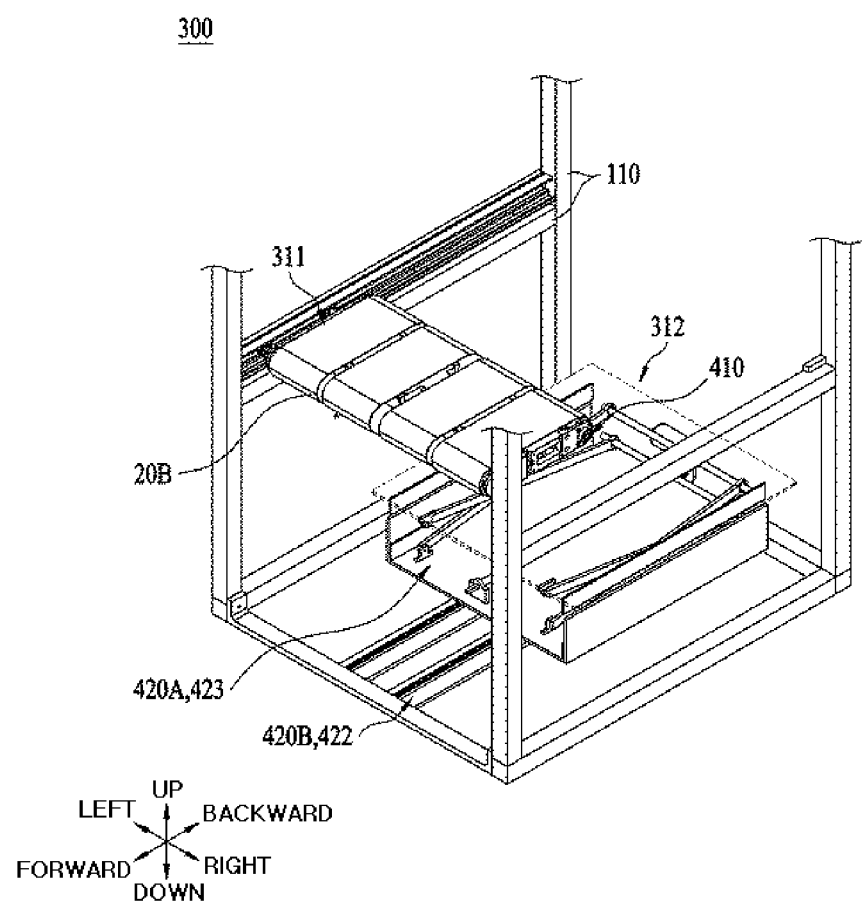
Figure 10:
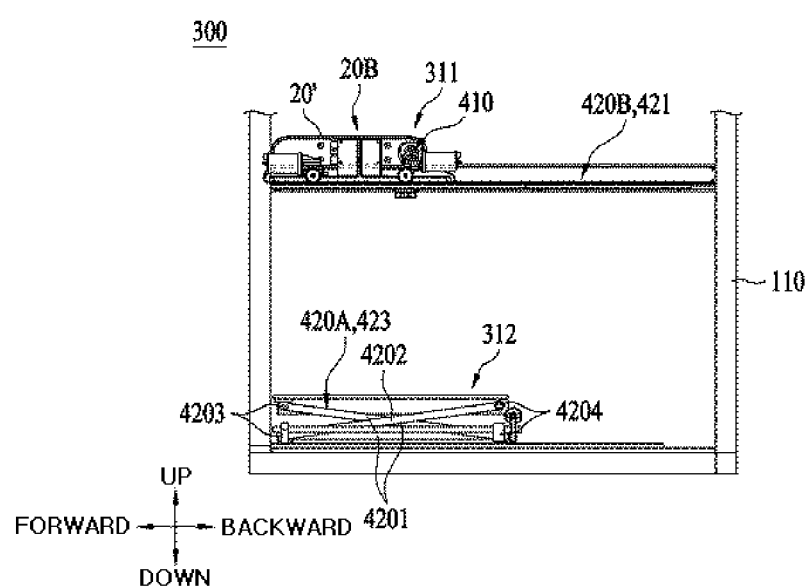
FIGS. 10 and 11 show a second embodiment of the unloading assembly related to the present disclosure.
Figure 11:
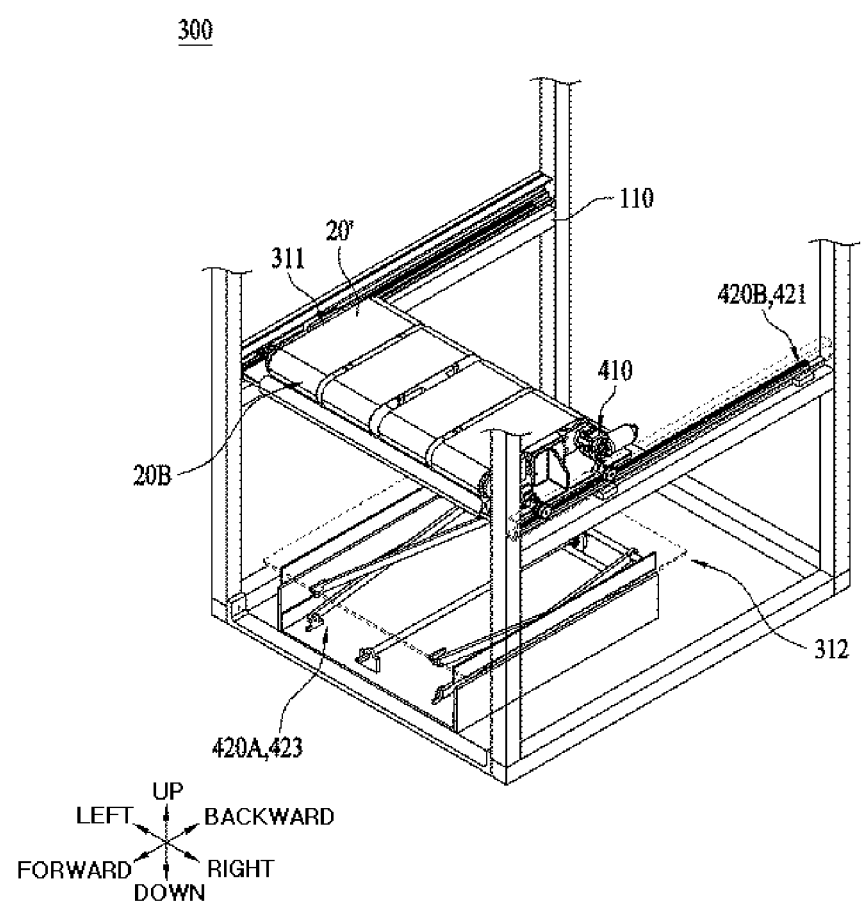
Figure 12:
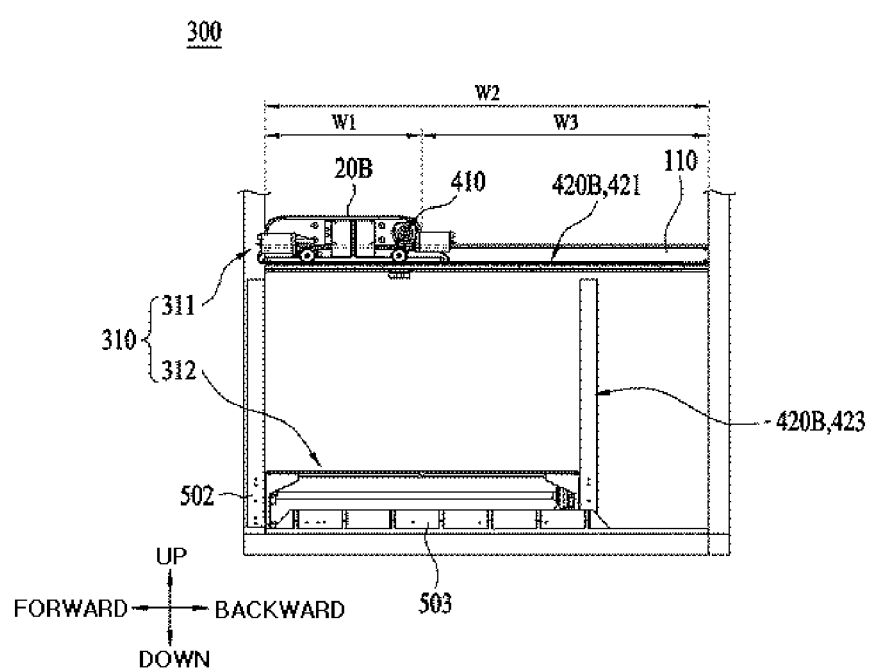
FIGS. 12 and 13 show a third embodiment of the unloading assembly related to the present disclosure.
Figure 13:
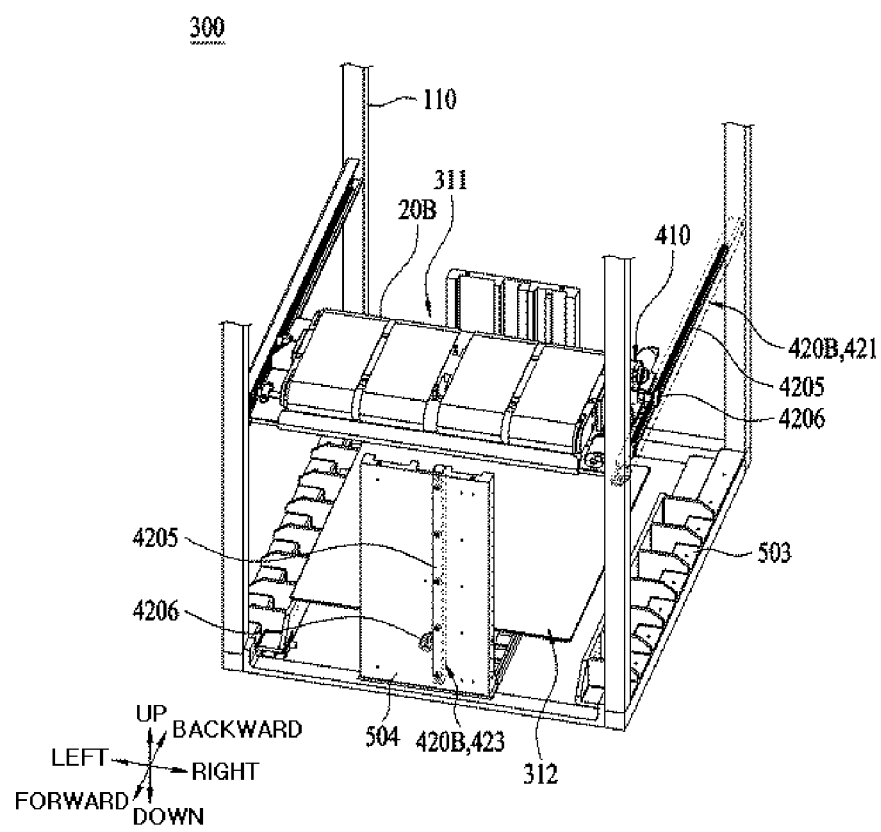
Figure 14:
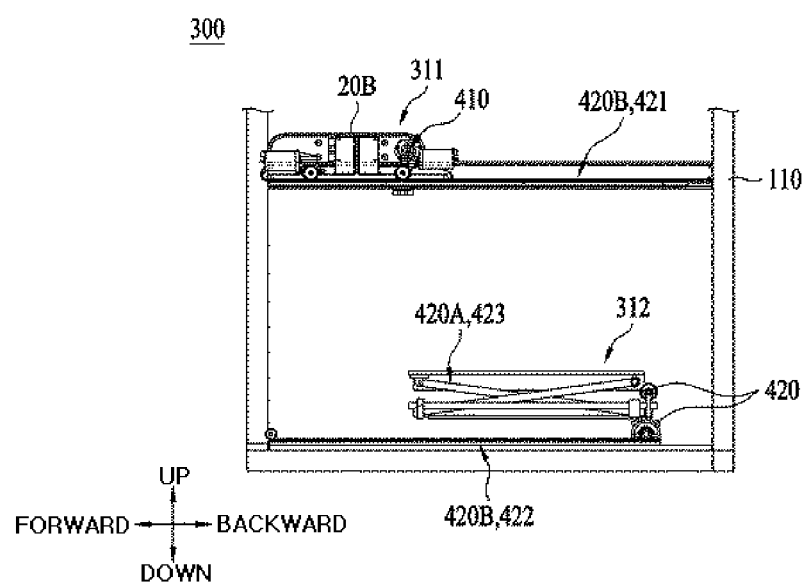
FIGS. 14 and 15 show a fourth embodiment of the unloading assembly related to the present disclosure.
Figure 15:
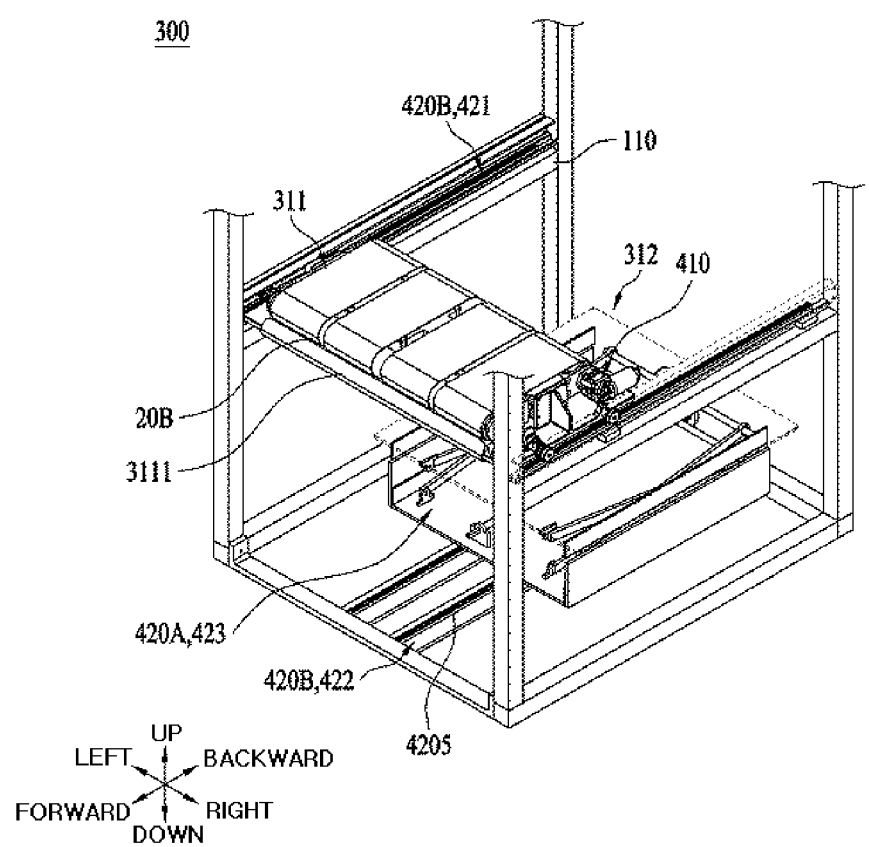

FIGS. 8 to 15 show several embodiments of the unloading assembly 300 in accordance with the present disclosure. FIGS. 8 and 9 show the first embodiment. FIGS. 10 and 11 show the second embodiment. FIGS. 12 and 13 show the third embodiment. FIGS. 14 and 15 show a fourth embodiment.

The unloading assembly 300 of the present disclosure proposes a configuration in which two members are independently driven, unlike a conventional configuration in which one member moves and loads folded clothes.

The unloading assembly 300 according to the embodiment of the present disclosure includes an unloading layer 310 that performs at least a portion of seating, transporting, and folding clothes. Particularly, the unloading layer 310 includes an upper member which seats primarily the clothes that are dropped after being folded and a lower member which seats the clothes that are dropped secondarily from the upper member. The upper member is defined as an upper unloading layer 311, and the lower member is defined as a lower unloading layer 312.

Common features of the embodiments to be described below are as follows. The upper unloading layer 311 includes a conveyor, and thus, is able to transport clothes in one direction, and the lower unloading layer 312 is able to adjust the height in accordance with situations by moving up and down. Also, at least one of the upper unloading layer 311 and the lower unloading layer 312 is provided to be movable in a forward and backward direction.

The feature that the upper unloading layer 311 is able to transport clothes through the conveyor and the feature that at least one unloading layer is provided to be movable in a forward and backward direction can maximize a forward and backward space utilization in the unloading assembly 300.

In particular, when the upper unloading layer 311 is provided to be movable in the forward and backward direction, the rotation and forward and backward movement of an unloading conveyor 20B of the upper unloading layer 311 allows a position to which the clothes that are being dropped from the folding assembly 200 to be freely determined. To the extreme degree, even when the clothes have no choice but to be seated to be biased forward or backward as the clothes are dropped from the folding assembly 200 to a specific position and in a specific direction, the clothes can be seated in any desired position through the above movement of the upper unloading layer 311. For example, when the clothes are discharged through steps S5 or S6 (see FIGS. 4 to 7), as long as the bottom of the discharged clothes reaches the top surface of the upper unloading layer 311, the unloading conveyor 20B rotates counterclockwise while the clothes are dropped. Accordingly, the folded clothes can be seated on the upper unloading layer 311 without being wrinkled.

With respect to the forward and backward direction of the clothes folding device 10, when the seating of the clothes is finished, the position of the upper unloading layer 311 is changed depending on cases. However, after the seating of the clothes is finished, the upper unloading layer 311 can move to the front end or rear end in accordance with the forward and backward movement of the upper unloading layer 311. Accordingly, the upper unloading layer 311 which has moved to the front end or the rear end may variably determine a position at which the clothes are to be secondarily dropped to the lower unloading layer 312.

As described above, by the moving mechanism of the upper unloading layer 311, since the position of the clothes which are dropped to the upper unloading layer 311 and the position of the clothes which are dropped from the upper unloading layer 311 to the lower unloading layer 312 may be variably determined, the amount of the forward and backward space required of the clothes folding device 10 due to the corresponding area can be minimized.

Meanwhile, the up and down movement of the lower unloading layer 312 determines an up and down distance between the upper unloading layer 311 and the lower unloading layer 312 (strictly, an up and down distance between the uppermost surface of the upper unloading layer 311 and the uppermost surface of the lower unloading layer 312 on which the clothes are loaded, hereinafter, defined as "secondary drop distance"), thereby the clothes can be dropped by as much as an appropriate height.

For example, a top surface 3121 of the lower unloading layer on which the clothes are not loaded or an uppermost end 1' of the loaded clothes (hereinafter, referred to as "the uppermost end of the loading portion") can be located very close to the upper unloading layer 311. When the uppermost end of the loading portion is provided adjacent to the upper unloading layer 311, the clothes can be seated on the lower unloading layer 312 as stable as possible without floating in the air when being dropped, even though the folded clothes have a short front-rear width.

Alternatively, the clothes may be dropped secondarily in a state where the uppermost end of the loading portion and the upper unloading layer 311 are spaced apart from each other by a specific distance. Since a certain forward and backward length of the clothes is obtained by that the uppermost end of the loading portion and the upper unloading layer 311 are spaced apart from each other by a distance, even when the folded clothes have a forward and backward length, a space in which the clothes can be positioned without being wrinkled is obtained as much as possible. Therefore, even when the clothes of the upper unloading layer 311 are not stably dropped to the lower unloading layer 312 because the upper unloading layer 311 has a long front-rear length or the clothes folding device 10 has a narrow front-rear space, it is possible to produce the same effect as the increase of the front-rear width by reducing the height of the loading layer 312.

The lower unloading layer 312 may be implemented to move in the forward and backward direction. This means that the forward and backward movement of the lower unloading layer 312 is practically beneficial when the front-rear width of the lower unloading layer 312 is smaller than the front-rear width of the clothes folding device 10, and allows the drop point of the clothes to be variably determined when the clothes are dropped from the upper unloading layer 311 to the lower unloading layer 312.

A rotation drive unit 410 and a translation drive unit 420 provide power for implementing a driving mechanism of the unloading assembly 300. Each of the rotation drive unit 410 and the translation drive unit 420 may include at least one motor 30.

The rotation drive unit 410 provides power for the rotational motion of the unloading conveyor 20B provided in the upper unloading layer 311.

The translation drive unit 420 provides power for the translation motion of the upper unloading layer 311 or the lower unloading layer 312. In particular, an upper front-rear drive unit 421 provides power for the forward and backward movement of the upper unloading layer 311, and an up and down drive unit 423 provides power for the up and down movement of the lower unloading layer 312. A lower front-rear drive unit 422 provides power for the forward and backward movement of the lower unloading layer 312.

The upper front-rear drive unit 421 and the lower front-rear drive unit 422 may include a rack-and-pinion structure 420B. Meanwhile, the up and down drive unit 423 may alternatively include one of a scissor type lift structure 420A and the rack-and-pinion structure 420B.

It is essential to provide the rotation drive unit 410 that rotates the unloading conveyor 20B and the up and down drive unit 423 that moves the lower unloading layer 312 in the up and down direction. Here, at least one of the upper front-rear drive unit 421 and the lower front-rear drive unit 422 may be provided. That is, only the lower front-rear drive unit 422 may be provided as in the first embodiment, or only the upper front-rear drive unit 421 may be provided as in the second and third embodiments. In addition, it goes without saying that both the upper front-rear drive unit 421 and the lower front-rear drive unit 422 may be provided as in the fourth embodiment.

In the case of the first embodiment (FIGS. 8 and 9), the lower unloading layer 312 moves in the up and down direction by the up and down drive unit 423 and moves in the forward and backward direction by the lower front-rear drive unit 422. Meanwhile, the upper unloading layer 311 is fixed to the frame 110 and performs only the rotation of the unloading conveyor 20B.

The up and down drive unit 423 is implemented as the scissor type lift structure 420A and moves the lower unloading layer 312 in the up and down direction, and the lower front-rear drive unit 422 is implemented as the rack-and-pinion structure 420B and moves the lower unloading layer 312 in the forward and backward direction. In particular, the scissor type lift structure 420A is formed within the rack-and-pinion structure 420B, so that not only the lower unloading layer 312 but also the scissor type lift structure 420A moves together in the forward and backward direction.

Even though the upper unloading layer 311 is fixed and the lower unloading layer 312 moves in the forward and backward direction, it is not difficult to determine the drop point of the clothes when the clothes are dropped secondarily. However, since the upper unloading layer 311 cannot move in the forward and backward direction even though the drop point of the clothes which are primarily dropped from the folding assembly 200 is determined, undesirable conditions are likely to occur.

Also, when the up and down drive unit 423 and the lower front-rear drive unit 422 are simultaneously implemented as in the first embodiment, the up and down drive unit 423 must be implemented on the structure of the lower front-rear drive unit 422. For this reason, structural instability is caused and a space for transmitting the power is difficult to obtain.

To compensate this problem, the second embodiment (FIGS. 10 and 11) proposes a structure in which the upper unloading layer 311 moves forward and backward by the upper front-rear drive unit 421.

The rack-and-pinion structure 420B constituting the upper front-rear drive unit 421 may be installed on both sides of the upper unloading layer 311 and in an area of the frame 110 corresponding to both sides of the upper unloading layer 311. Thus, the upper unloading layer 311 can perform a relative movement with respect to the frame 110.

When the clothes are dropped primarily from the folding assembly 200 to the upper unloading layer 311, the upper front-rear drive unit 421 positions the upper unloading layer 311 such that the upper unloading layer 311 meets a vertical line of the drop point of the clothes (see FIG. 4). Then, while the clothes are dropped to and seated on the upper unloading layer 311, the rotation drive unit 410 rotates the unloading conveyor 20B, thereby allowing the clothes to be seated on the upper unloading layer 311 without being wrinkled.

When the clothes are dropped secondarily from the upper unloading layer 311 to the lower unloading layer 312, the rotation drive unit 410 and the upper front-rear drive unit 421 operate simultaneously to rotate the unloading conveyor 20B and to move the lower unloading layer 312 in the forward and backward direction simultaneously.

The rotation of the unloading conveyor 20B by the operation of the rotation drive unit 410 allows the clothes to be dropped from the upper unloading layer 311 without friction, and the movement of the upper unloading layer 311 by the operation of the upper front-rear drive unit 421 allows the clothes to be seated on the lower unloading layer 312 without being wrinkled.

Describing the operation in more detail, when the top surface 20' of the unloading conveyor 20B moves forward, the upper unloading layer 311 may move backward, and when the top surface 20' of the unloading conveyor 20B moves backward, the upper unloading layer 311 may move forward.

The up and down drive unit 423 may be implemented by the scissor type lift structure 420A. The scissor type lift structure 420A includes two link bars 4201 of which one side is rotationally fixed and the other side is slidingly fixed. The two link bars 4201 are provided to intersect each other, and the intersections of the two link bars 4201 are rotatably fastened to form an intersecting axis 4202. A slide fixing point 4203 of one link bar 4201 and a rotation fixing point 4204 of the other link bar are fastened to the lower unloading layer 312. the two link bars 4201 rotate relatively in accordance with the movement of the slide fixing point 4203, so that the lower unloading layer 312 is lifted or lowered.

The up and down drive unit 423 implemented by the scissor type lift structure 420A has a simple structure and occupies a relatively small space. However, the slide fixing point 4203 cannot be completely fixed to the frame 110 or the lower unloading layer 312, so that the up and down drive unit 423 is structurally unstable. In particular, this causes a problem that the center of gravity closer to one side is formed when the lower unloading layer 312 is raised. In addition, a lot of initial torque is required to raise the lower unloading layer 312 from the lowermost end, so that it is disadvantageous in terms of energy efficiency.

In order to compensate this problem, the third embodiment (FIGS. 12 and 13) proposes that the up and down drive unit 423 has the rack-and-pinion structure 420B. The rack-and-pinion structure 420B of the up and down drive unit 423 may be installed on both sides of the lower unloading layer 312 and on a side of a drawer 502 corresponding to both sides of the lower unloading layer 312.

Here, said both sides may mean front and rear both sides or left and right both sides. Considering that a reinforcing rib 503 for improving the structural stability of the device should be provided on the left and right sides of the clothes folding device 10, the rack-and-pinion structure 420B is preferably provided on the front and rear both sides.

Here, the drawer 502 refers to a member that forms a space in which clothes are to be loaded in the unloading assembly 300. The lower unloading layer 312 and the up and down drive unit 423 are mounted in the space formed by the drawer 502, and the loaded clothes can be stored in the space. If necessary, the drawer 502 may be pulled out from the frame 110 by a predetermined distance, so that a user can easily take out the loaded clothes.

Here, the loading refers to clothes that are fully seated on the lower unloading layer 312 and can be taken out by the user, or a stacked state of such clothes.

A pinion gear 4206 is rotatably fixed to the lower unloading layer 312, and a rack gear 4205 which forms a guide where the pinion gear is engaged and moves is provided on both sides of the drawer 502. It is preferable that the rack gear 4205 and the pinion gear 4206 are coupled to the drawer 502 through a bracket 504 so that they are not exposed to the exterior of the drawer 502.

In the case of this embodiment in which both the upper front-rear drive unit 421 and the lower front-rear drive unit 422 are provided in the form of the rack-and-pinion structure 420B, structural stability of the two unloading layers 310 is ensured. That is, unlike the scissor type lift structure 420A, two points supporting the lower unloading layer 312 are not only distributed on both sides but also support in a vertical direction, so that stress, particularly shear stress can be minimized to the minimum degree. Also, there is an advantage that the power by the drive unit can be transmitted without loss.

Also, since the upper unloading layer 311 can move forward and backward, the upper unloading layer 311 can be designed in such a way that a front-rear width W1 thereof is formed to the minimum degree for the seating of the clothes. The fact that the front-rear width W1 of the upper unloading layer 311 can be set to the minimum degree means that an area in which the upper unloading layer 311 covers the lower unloading layer 312 becomes smaller, so that a useless space can be minimized. For a concrete example, if a design condition of a width W2 that the upper unloading layer 311 can occupy in the forward and backward direction on the clothes folding device 10 is in a range of about 600 mm to 650 mm, the front-rear width W1 of the upper front-rear drive unit 421 that moves in the forward and backward direction can be designed in a range of 200 mm to 250 mm. Here, a front-rear stroke distance W3 of the upper front-rear drive unit 421 at this point of time is about 400 mm. From the viewpoint of ratio, the front-rear width W1 of the upper unloading layer 311 with respect to the space W2 that the upper unloading layer 311 can occupy in the forward and backward direction is in a range of 0.28 to 0.36. Also, the front-rear stroke distance W3 of the upper unloading layer 311 with respect to the space W2 that the upper unloading layer 311 can occupy in the forward and backward direction is in a range of 0.5 to 0.65.

Meanwhile, as in the fourth embodiment (FIGS. 14 and 15), the upper front-rear drive unit 421 and the lower front-rear drive unit 422 can be simultaneously implemented. Specific characteristics of each of the drive units are the same as those described in the first and second embodiments. Accordingly, the structure and characteristics described in each embodiment may be applied in the same manner.

FIGS. 16A to 16C and FIGS. 17A to 17C show two embodiments of a process in which clothes are secondarily dropped and seated from the upper unloading layer 311 to the lower unloading layer 312 in accordance with a time sequence.

Figure 16A:
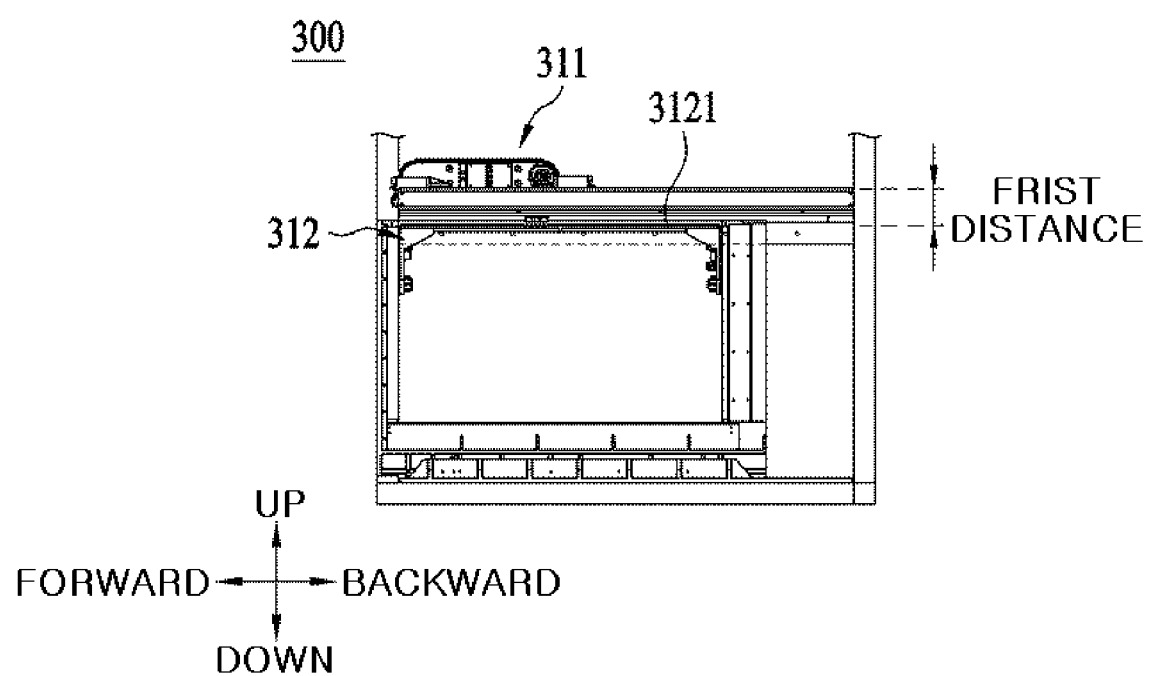
FIGS. 16A to 16C show an embodiment of a process in which clothes are secondarily dropped and seated from the upper unloading layer to the lower unloading layer in accordance with a time sequence.
Figure 16B:
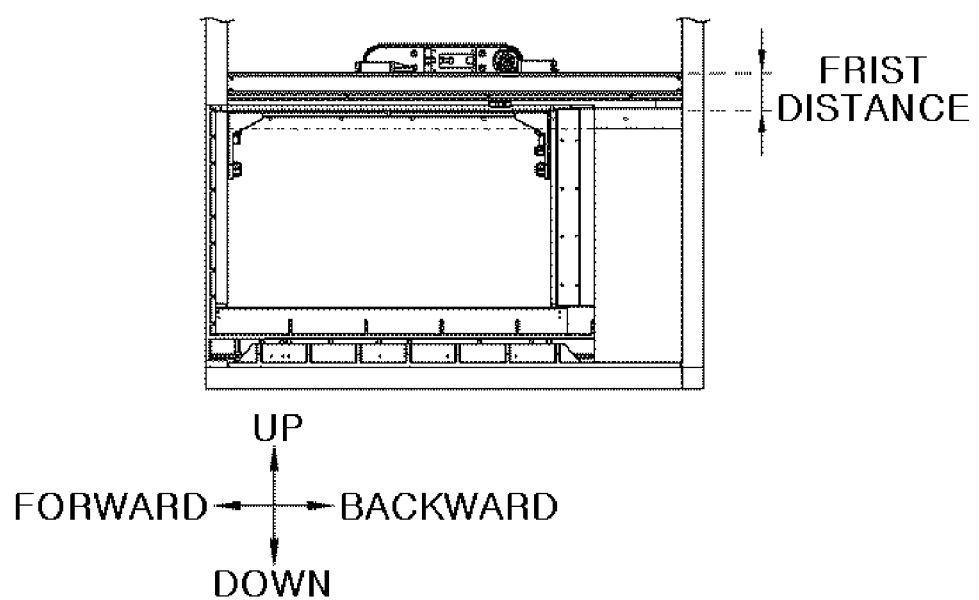
Figure 16C:
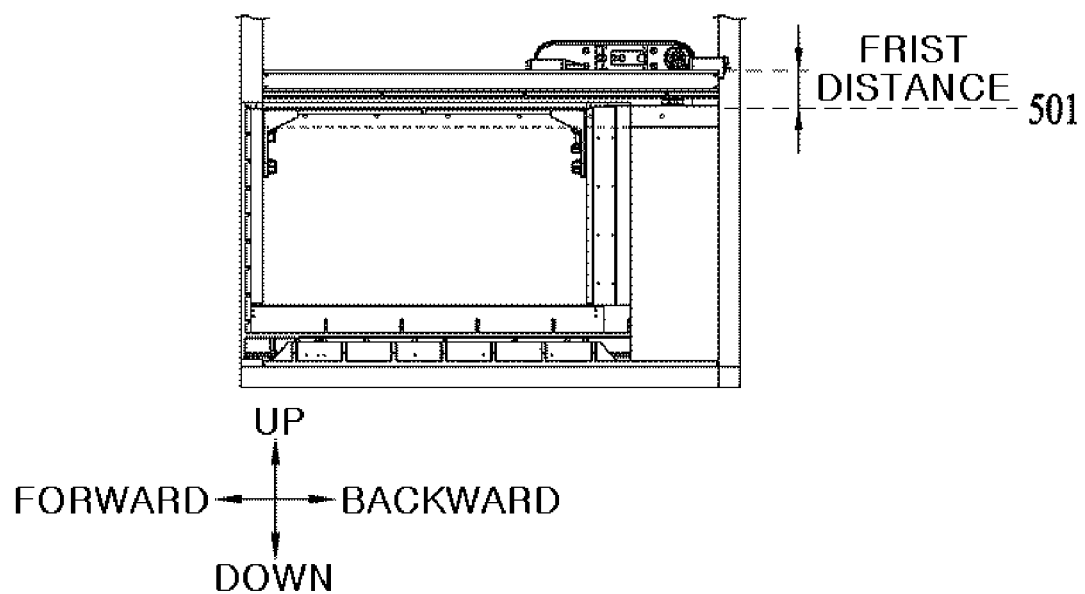
Figure 17A:
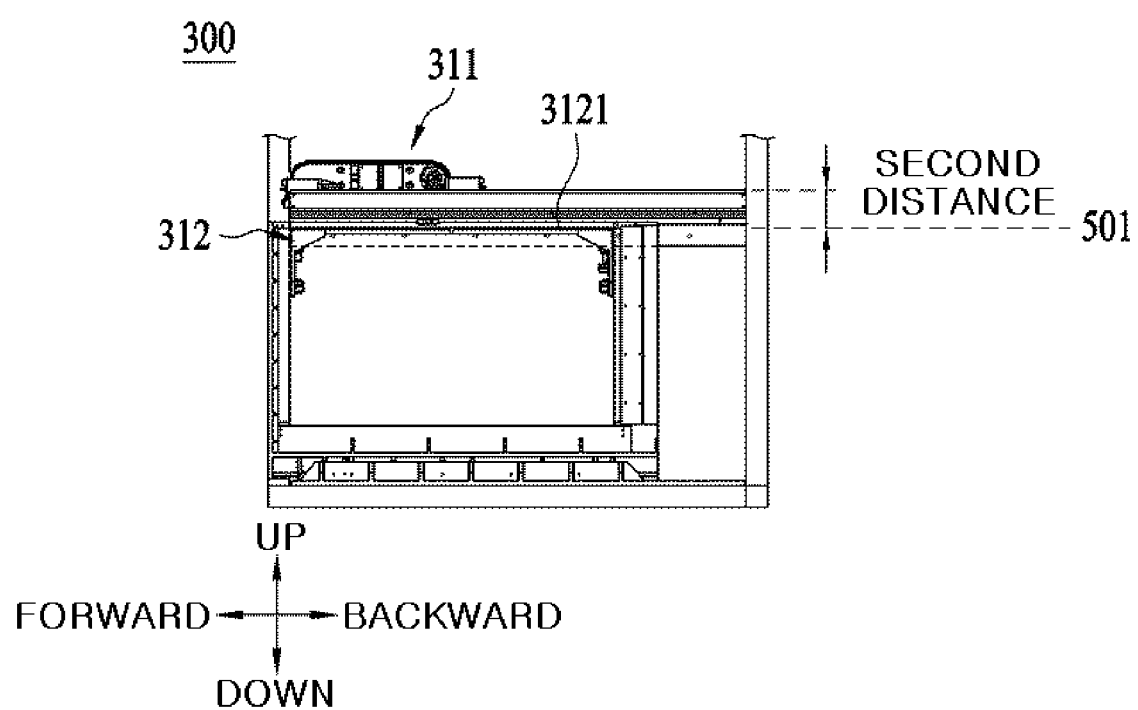
FIGS. 17A to 17C show an embodiment of a process in which clothes are secondarily dropped and seated from the upper unloading layer to the lower unloading layer in accordance with a time sequence.
Figure 17B:
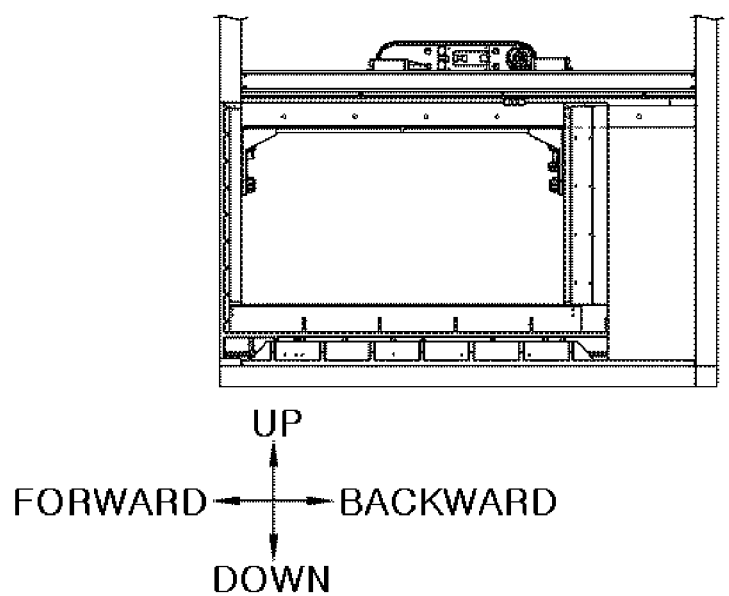
Figure 17C:
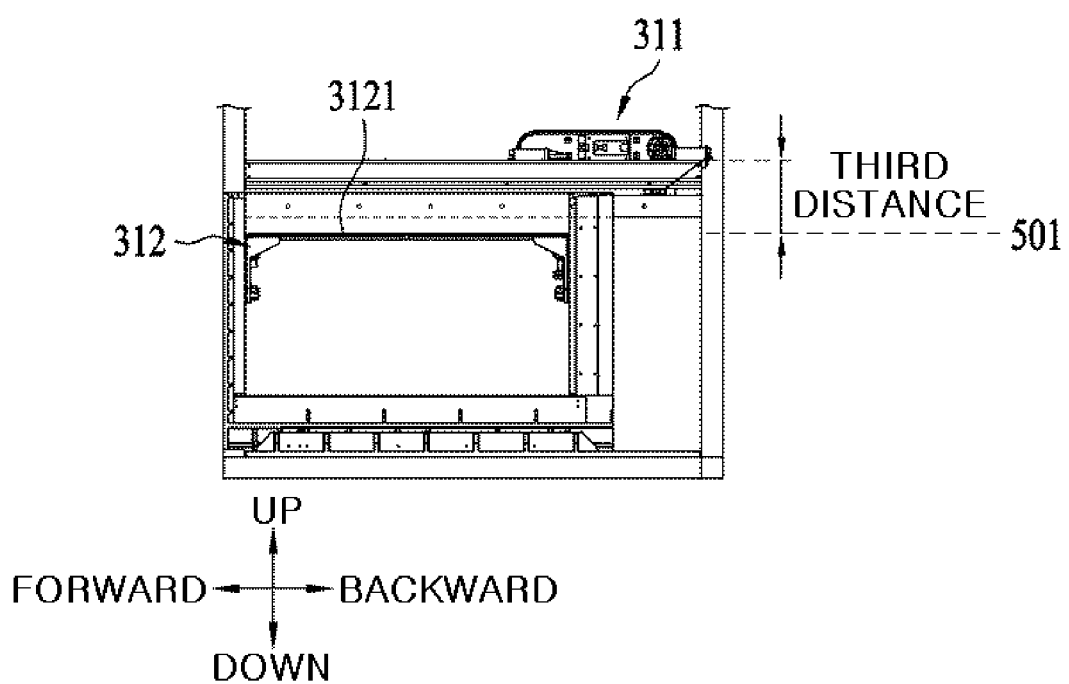

Referring to FIGS. 16A to 16C, while the clothes are secondarily dropped, a distance from the uppermost end of the loading portion to the upper unloading layer 311, that is, the secondary drop distance, may maintain a first distance. This means that the height of the lower unloading layer 312 does not change during the secondary dropping. The first distance may be maintained to be relatively narrow or wide, and the advantages according to each state are the same as those described above.

Meanwhile, referring to FIG. 17, while the clothes are secondarily dropped, the secondary drop distance may gradually increase from a second distance to a third distance. The advantage of this embodiment is that when the clothes are initially seated on the lower unloading layer 312, the drop distance is maintained to be narrow to prevent unintended wrinkle and when the clothes are finally seated, a space is secured in the height direction so that it is possible to produce the same effect as that of the case where a forward and backward space is expanded. Therefore, combined advantages can be obtained.

In order to figure out the secondary drop distance, the clothes folding device 10 may include a load sensor 501. The load sensor 501 senses the height of the top surface of the lower unloading layer 312 or the height of the uppermost end of the clothes loaded on the lower unloading layer 312. The load sensor 501 may be implemented in the form of at least one proximity sensor. For example, the load sensor 501 in the form of a proximity sensor is provided near at least one point on the side of the drawer 502. When the lower unloading layer 312 is located at the corresponding height or when the loaded clothes are located at the corresponding height, the load sensor 501 can recognize it. The above-described at least one point may be located at a height corresponding to a lower boundary value among upper and lower boundary values of the first distance, the second distance, and the third distance.

Figure 18:
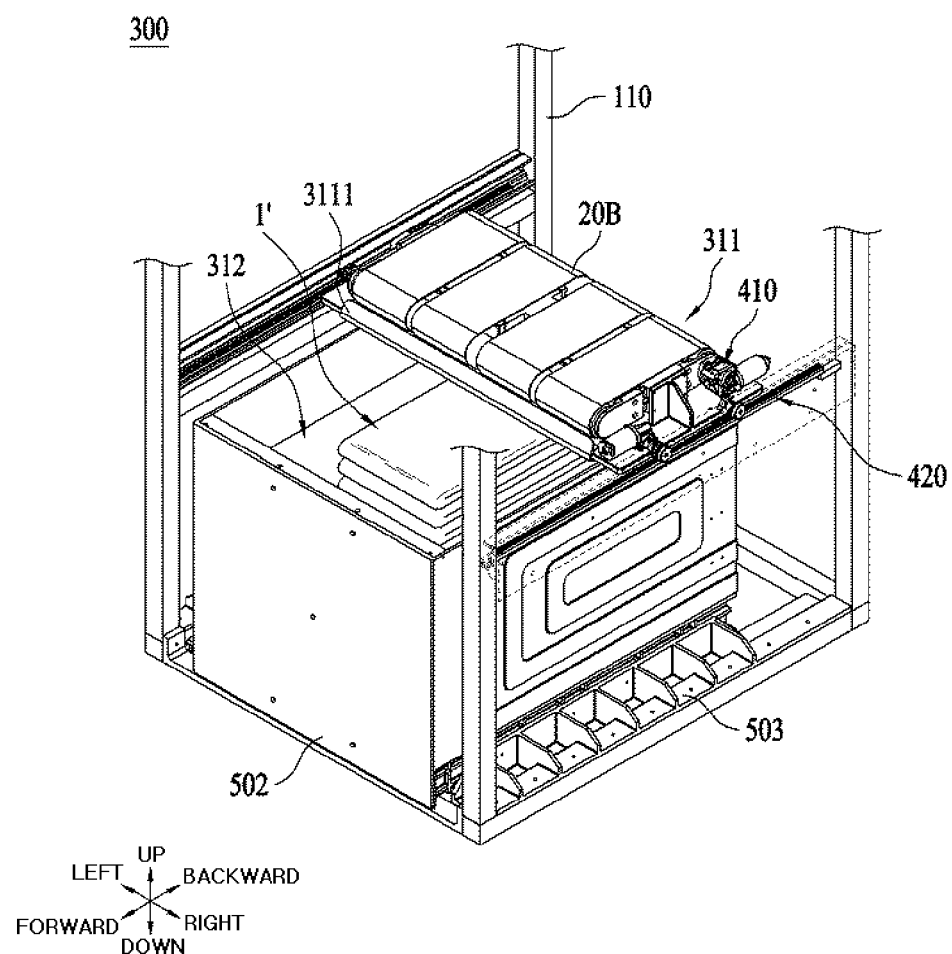
FIG. 18 is a perspective view of the unloading assembly related to the present disclosure.

FIG. 18 is a perspective view of the unloading assembly 300 related to the present disclosure.

A pressure guide 3111 may be provided on the lower surface of the upper unloading layer 311. The pressure guide 3111 allows the loaded clothes to be pressed to reduce the volume of the clothes and to more stably maintain the folded state of the clothes.

In particular, when the upper unloading layer 311 moves in the forward and backward direction, the pressure guide 3111 can also move together, so that the pressure guide 3111 can selectively press various areas of the loaded clothes.

The up and down drive unit 423 may drive such that the uppermost end of the clothes loaded on the lower unloading layer 312 is pressed by the pressure guide 3111. That is, this drive may include a rising process. When the clothes are seated, the secondary drop distance is sufficiently formed, and when the clothes are seated and loaded, the secondary drop distance is reduced so that the loading portion can be pressurized. The pressing state may be performed temporarily or may be repeatedly performed.

Figure 19A:
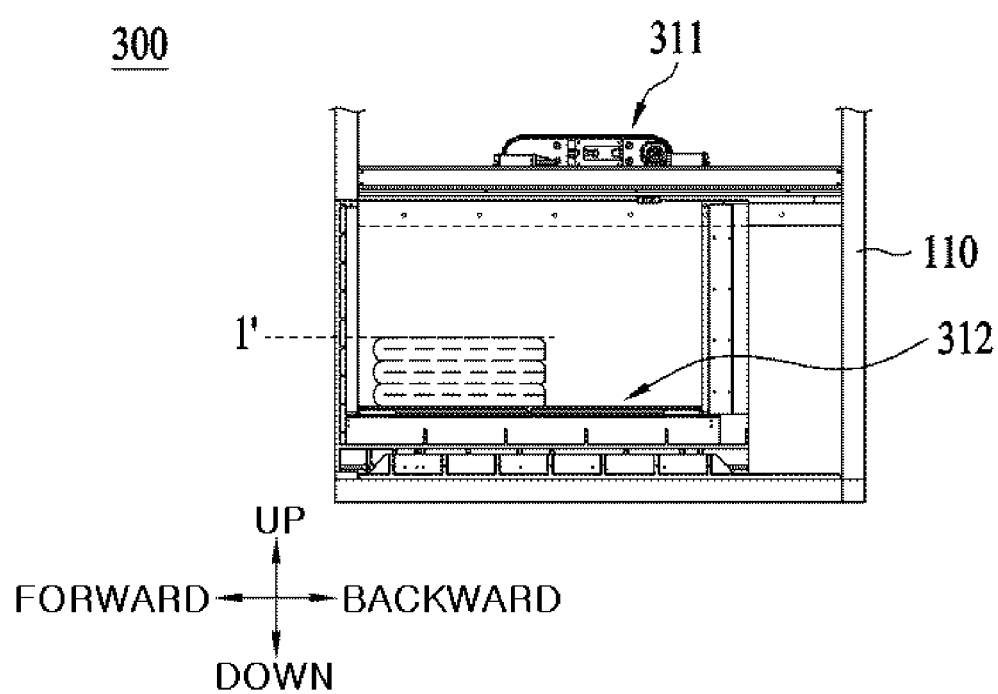
FIGS. 19A and 19B are side views of the unloading assembly related to the present disclosure.
Figure 19B:
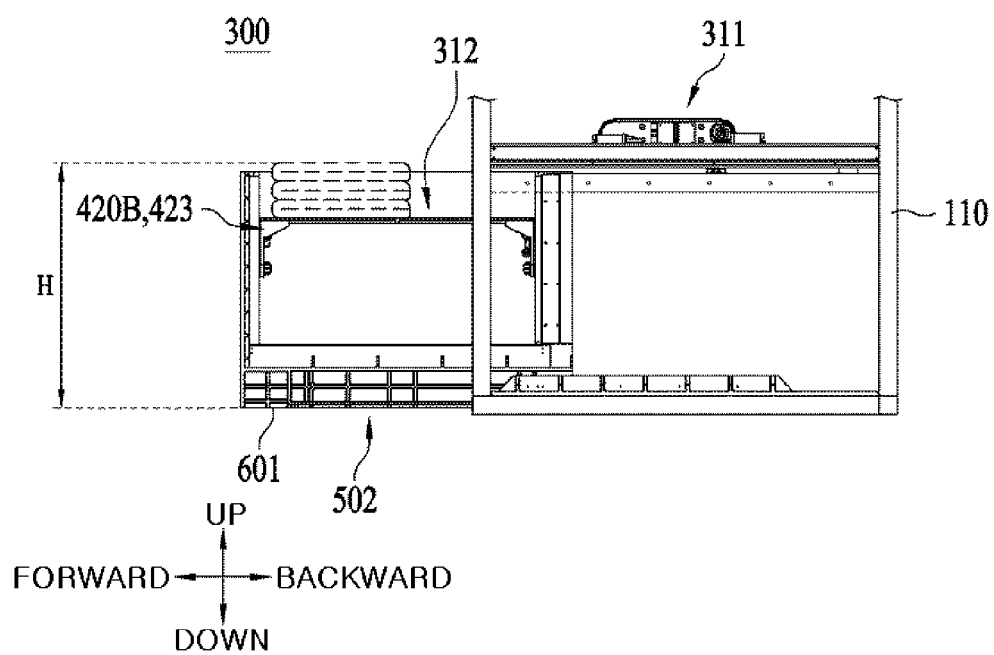

FIGS. 19A and 19B are side views of the unloading assembly 300 related to the present disclosure.

As described above, the drawer 502 that forms a space in which the folded clothes are stored may have a structure in which the clothes are pulled out. This may be automatically implemented by a drive unit that operates electrically and mechanically, or may be implemented manually by an external force of a user, etc.

When the drawer 502 is opened to take out the clothes, the lower unloading layer 312 may be driven such that the uppermost end of the loading portion of the up and down drive unit 423 becomes a predetermined distance "H" from a bottom surface 601. Accordingly, the user can take out the clothes without bending the back too much.

It is apparent to those skilled in the art that the present invention can be embodied in other specific forms without departing from the spirit and essential characteristics of the present invention.

The above detailed description should not be construed as restrictive in all respects and should be considered as illustrative. The scope of the present invention should be determined by a reasonable interpretation of the appended claims, and all modifications within the equivalent scope of the present invention are included in the scope of the present invention.

The invention claimed is:

1. A clothes folding device configured to perform folding in a process of transporting clothes, the clothes folding device comprising:
    a loading assembly configured to push in the clothes and to seat the clothes on a loading conveyor for transportation;
    a folding assembly configured to transport the clothes forward or backward and to perform the folding of the clothes;
    an unloading assembly provided below the folding assembly and configured to load the clothes discharged from the folding assembly,
    wherein the unloading assembly comprises:
        an upper unloading layer configured to seat the clothes folded by and dropped from the folding assembly, the upper unloading layer comprising an unloading conveyor,
        a rotation drive unit configured to drive the unloading conveyor to rotate,
        an upper front-rear drive unit configured to move the upper unloading layer within a space in a forward and backward direction, wherein the space provides room for accommodation of the upper unloading layer and movement of the upper unloading layer in the forward and backward direction,
        a lower unloading layer configured to seat the clothes dropped from the upper unloading layer; and
        an up and down drive unit configured to move the lower unloading layer in an up or down direction,
    wherein a ratio of a front-rear width of the upper unloading layer with respect to a front-rear width of the space is in a range of 0.28 to 0.36, and
    wherein a ratio of a front-rear stroke distance of the upper unloading layer with respect to the front-rear width of the space is in a range of 0.5 to 0.65.

2. The clothes folding device of claim 1, wherein the rotation drive unit and the upper front-rear drive unit are configured to rotate together while the clothes are dropped from the upper unloading layer to the lower unloading layer, and
    wherein the rotation drive unit and the upper front-rear drive unit are configured to be driven such that when a top surface of the unloading conveyor moves forward, the upper unloading layer moves backward, and when the top surface of the unloading conveyor moves backward, the upper unloading layer moves forward.

3. The clothes folding device of claim 2, wherein the up and down drive unit is configured to be driven such that, while the clothes are dropped from the upper unloading layer to the lower unloading layer, a secondary drop distance, that is, a distance from an uppermost end of the clothes loaded on the lower unloading layer or a top surface of the lower unloading layer on which the clothes are not loaded to the upper unloading layer maintains a first distance.

4. The clothes folding device of claim 2, wherein the up and down drive unit is configured to be driven such that, while the clothes are dropped from the upper unloading layer to the lower unloading layer, a secondary drop distance, that is, a distance from an uppermost end of the clothes loaded on the lower unloading layer or a top surface of the lower unloading layer on which the clothes are not loaded to the upper unloading layer increases from a second distance to a third distance.

5. The clothes folding device of claim 2, further comprising a load sensor which senses a height of a top surface of the lower unloading layer or a height of an uppermost end of the clothes loaded on the lower unloading layer.

6. The clothes folding device of claim 1, further comprising a frame which forms an external skeleton of the clothes folding device, is disposed at an outer edge, and defines a minimum working space of the clothes folding device, wherein the unloading assembly further comprises a drawer which forms a space in which clothes are loaded and mounts the lower unloading layer and the up and down drive unit.

7. The clothes folding device of claim 6, wherein the upper front-rear drive unit comprises a rack-and-pinion structure installed on both sides of the upper unloading layer and in an area of the frame corresponding to both sides of the upper unloading layer.

8. The clothes folding device of claim 7, wherein the up and down drive unit comprises the rack-and-pinion structure installed on both sides of the lower unloading layer and in a side of the drawer corresponding to both sides of the lower unloading layer.

9. The clothes folding device of claim 7, wherein the up and down drive unit comprises a scissor type lift structure which is installed on a bottom surface of the drawer and has an upper portion to which the lower unloading layer is coupled.

10. The clothes folding device of claim 7, further comprising a lower front-rear drive unit which moves the lower unloading layer forward or backward, wherein the lower front-rear drive unit comprises the rack-and-pinion structure which is fastened to the lower unloading layer and moves the lower unloading layer in the forward and backward direction.

11. The clothes folding device of claim 1, further comprising a pressure guide provided on a lower surface of the upper unloading layer, wherein the up and down drive unit is driven such that an uppermost end of the clothes loaded on the lower unloading layer is pressed by the pressure guide.

12. The clothes folding device of claim 1, wherein the unloading assembly further comprises a drawer which forms a space in which clothes are stored, and
    wherein the up and down drive unit is driven such that when the drawer is opened to take out the clothes, a top surface of the lower unloading layer on which the clothes are not present or an uppermost end of the clothes loaded on the lower unloading layer maintains a predetermined distance from a bottom surface of the drawer.

13. The clothes folding device of claim 1, wherein the front-rear width of the space is a sum of the front-rear width of the upper unloading layer and the front-rear stroke distance of the upper unloading layer.

\* \* \* \* \*